United States Patent [19]
Fritz et al.

[11] 4,082,635
[45] Apr. 4, 1978

[54] ULTRAVIOLET LIGHT-CURABLE DIACRYLATE HYDANTOIN ADHESIVE COMPOSITIONS

[75] Inventors: André Fritz; Barbara Lee Dunn, both of Okemos, Mich.

[73] Assignee: Ciba-Geigy Corporation, Ardsley, N.Y.

[21] Appl. No.: 711,002

[22] Filed: Aug. 2, 1976

[51] Int. Cl.² .......................... C08F 2/46; C08F 30/08
[52] U.S. Cl. ........................... 204/159.23; 204/159.13; 204/159.24; 260/46.5 UA; 260/46.5 E; 260/46.5 G; 260/827; 427/54; 428/441; 428/447; 428/461; 428/515; 526/263; 526/279

[58] Field of Search ...................... 204/159.23, 159.24, 204/159.13; 427/54; 526/263, 279; 260/46.5 UA, 46.5 E, 46.5 G

[56] References Cited

U.S. PATENT DOCUMENTS

| | | | |
|---|---|---|---|
| 3,821,098 | 6/1974 | Garratt et al. | 204/159.22 |
| 3,847,769 | 11/1974 | Garratt et al. | 204/159.22 |

*Primary Examiner*—Richard B. Turer
*Attorney, Agent, or Firm*—Vincent J. Cavalieri

[57] ABSTRACT

Ultraviolet light-curable adhesive compositions are prepared from diacrylate hydantoin compounds, a photoinitiator and a silane. The adhesives are useful for bonding substrates, one of which is transparent to ultraviolet light.

4 Claims, No Drawings

ULTRAVIOLET LIGHT-CURABLE DIACRYLATE HYDANTOIN ADHESIVE COMPOSITIONS

This invention relates to ultraviolet light-curable one-package diacrylate hydantoin adhesive composition comprising:

(a) from 25–75 parts of a diacrylate of the formula

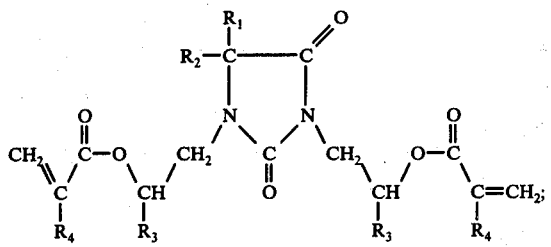

(b) from 25–75 parts of a diacrylate comprising
 (1) from 80 to 100 parts of a compound of the formula

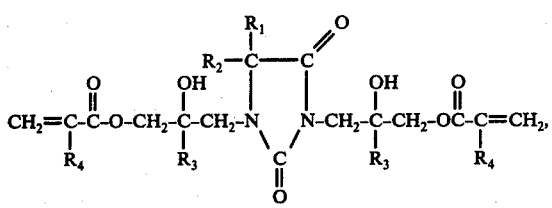

and (2) from 0 to 20 parts of a compound of the formula

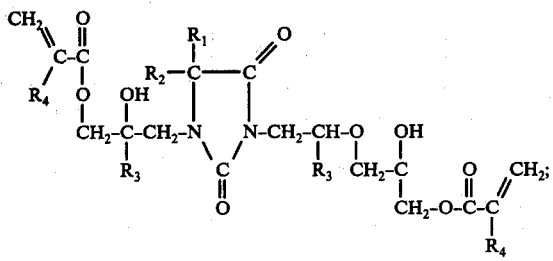

(c) From 0.01 to 2 parts of a silane; and
(d) from 0.01 to 3 parts of a light sensitizer wherein each of $R_1$ and $R_2$ is hydrogen, alkyl of 1 to 8 carbon atoms, cycloalkyl of 5 to 6 carbon atoms, or phenyl or together $R_1$ and $R_2$ is tetramethylene or pentamethylene; and $R_3$ and $R_4$ are hydrogen or methyl.

The alkyl groups employed herein include both straight- and branch-chain alkyl groups, examples of which are methyl, ethyl, propyl, isopropyl, butyl, isobutyl, penthyl, neopenthyl, amyl, isoamyl, sec-amyl, hexyl, octyl and the like.

The diacrylate hydantoin adhesive compositions of this invention have significant advantages over prior art acrylate adhesive compositions in that the compositions of this invention have generally lower viscosity, which results in easier processing, have relatively shorter cure times, and the cured material is not brittle.

The diacrylate hydantoin compounds used in the adhesive composition are known materials which are described in U.S. Pat. Nos. 3,852,302 and 3,808,226.

The adhesive compositions of this invention have the advantage, when combined in the ratios disclosed, of having a faster cure and are more flexible after curing as compared to when the diacrylates of components (a) or (b) are used alone.

Also, the viscosity of the diacrylate hydantoin compounds of component (a) of the instant invention, which are described in U.S. Pat. No. 3,808,226, are not suitable as an adhesive composition which may be cured by ultraviolet light.

Using ultraviolet radiation, it is necessary to have a photoinitiator present in the adhesive compositions. The photoinitiator absorbs the radiation to produce free radicals which initiate polymerization. Examples of the light sensitizers or photoinitiators used in this invention are carbonyl compounds such as 2,3-hexadione, diacetylactophenone, benzoin and benzoin ethers such as dimethyl, ethyl and butyl derivatives, for example, 2,2-diethoxyacetophenone and 2,2-dimethoxyacetophenone, benzophenone in combination with a catalyst such as triethylamine, N,N'-dibenzylamine, and dimethylaminoethanol, beozophenone plus Michler's Ketone; nitrogen-containing compounds such as diazomethane, azo-bis-isobutyronitrile, hydrazine, phenylhydrazine, and trimethylbenzylammonium chloride; sulphur-containing compounds such as benzene sulfonate, diphenyl-disulfide and tetramethylthiuram-disulfide. Such light sensitizers are used alone or in combination with each other.

As noted, the compositions of this invention also contain a silane adhesion promoter. These are derivatives of trichlorosilane with the general formula R'SI(OR)$n$, where R' is an organic group and preferably a reactive organic group, and $n$ is 2 or 3. Organic functional groups representative of R' include vinyl, aminoalkyl, acrylatoalkyl, glycidoxyalkyl, and variations of these. The alkoxy substituents representative of OR are methoxy, ethoxy or B-methoxyethoxy. Examples of the silane adhesion promoters which may be used in the compositions of this invention are as follows:

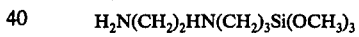

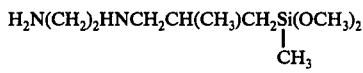

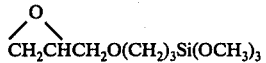

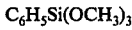

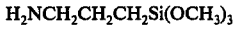

The ultraviolet light-curable resinous compositions of this invention have long pot life so long as they are stored in a dark place. Also, it noted that the curable resinous compositions of this invention can be used as is, so they can easily be used in practice by the user. Adhesive compositions of this invention may easily be prepared by intimately mxing together components (a) through (d) in the specified amounts. The final viscosity of the adhesive composition is in the range of from 500 to 3,000 cps. at 25° C and, preferably, from 1,000 to 2,000.

With respect to the amount of each component present in the adhesive composition, a preferred formulation contains an amount of component (a) which is in the range of from 40 to 60 parts; and amount of component (b) which is present in the range of from 40 to 60 parts; an amount of component (c) which is present in the range of 0.3 to 0.7 parts; and an amount of component (d) which is present in the range of from 0.2 to 1 part.

As noted above, the one-package adhesive composition of this invention cures rapidly, and possesses a low viscosity which wets the bonding surfaces well. The adhesive composition cures to a transparent bond on glass surfaces and it is generally unaffected by long-term low intensity ultraviolet radiation, has good heat stability, water and weathering resistance. The adhesive composition, when exposed to ultraviolet radiation, attains maximum bond strength when exposed to high intensity ultraviolet radiation within 5 to 25 seconds. Further exposure is unnecessary but it does not appear to degrade the adhesive strength. At least one of the substrates to be joined must be glass or some other material transparent to ultraviolet light. Thus, the adhesive composition of this invention is a suitable adhesive for bonding glass to glass, glass to plastic, and glass to metal.

The adhesive compositions of this invention should be applied so as to have a bond line thickness, preferably of from 1 to 3 mils. Beads of adhesive can be dispensed on the area to be bonded and either spread with a spatula or pressed out with the transparent substrate until the bond area is thoroughly covered and no air bubbles are present. If the exposure time is relatively short, excess adhesive outside the bonded area may be removed with a solvent wipe immediately after the curing of the adhesive within the bonded area. The materials to be bonded should be fixed in the bonding position before any exposure to ultraviolet light.

Exact curing time of adhesive compositions of this invention will depend upon the lamp power of the ultraviolet source, the distance from the source of the light, as well as the transparency to ultraviolet light of the substrates being bonded. Generally, the more intense the light source, or the closer the light source, the faster the cure.

The light-curable adhesive compositions can easily be cured under irradiation of the rays emitted from a mercury lamp, an ultraviolet fluorescent lamp, a carbon-arc lamp or a Xenon lamp, and preferably in the absence of oxygen. All of these devices and sources are well known in the art and those skilled in radiation technology are fully aware of the manner in which the radiation is generated and the precautions to be exercised in its use. U.S. Pat. Nos. 3,7000,643, 3,715,293 and 3,801,329 describe in some detail both high and low intensity ultraviolet light sources which may be used to cure the adhesive compositions of this invention.

While the adhesive compositions of this invention possess a relatively long shelf life, a polymerization inhibitor may be used, examples of which are t-methoxyphenol, hydroquinone, and alkyl and alkyl-substituted hydroquinones and quinones, tert-butylcatechol, pyrogallol, copper resinate, naphthylamines, B-naphthol, 2,6-di-t-butyl-p-cresol, copper salts and the like.

It is also possible in certain cases to add from about 5 to 20% by weight based on the weight components (a) and (b) of other suitable monomers to the adhesive compositions of this invention, in particular, compounds of the acrylic acid series, such as esters from acrylic acid or methacrylic acid, and alcohols or phenols, i.e., methylacrylate, ethylacrylate, butylacrylate, dodecylacrylate, methylmethacrylate, acrylnitrile, methacrylonitrile, ethyleneglycol dimethacrylate, hexanediodiacrylate, penterythritoltriacrylate, trimethylolpropanetriacrylate. It is, moreover, possible to use other reactive olefinic unsaturated monomers, such as, e.g., styrene, divinylbenzene, n-vinylpyrolidone, vinyl esters such as vinylacetate, allyl compounds such as diallylphthalate, and others.

It may also be advantageous in some cases to add to the compositions of this invention minor amounts and preferably from about 0.1 to 0.3% by weight of polymerization catalysts forming free radicals, such as, e.g., peroxides, azo compounds, or persulphates.

To further illustrate the nature of this invention and the processes employed in preparing and curing the diacrylate hydantoin adhesive compositions of this invention, the following examples are given below:

EXAMPLE 1

A light-curable composition was prepared by mixing 48.8 parts by weight of the diacrylate of 1,3-bis-($\beta'$-hydroxyethyl)-5,5-dimethylhydantoin, 48.8 parts by weight of the diacrylate of 1,3-diglycidyl-5,5-dimethylhydantoin, 1.9 parts by weight a dimethoxy phenylacetophenone and 0.5 parts by weight of aminopropyltriethoxy silane. The adhesive was used to bond the following substrates: glass to glass, glass to aluminum, glass to stainless steel, glass to acrylic coated steel. The glass to glass specimens were prepared by bonding two glass pieces (1 × 4 × ¼inch) with a ½ inch overlap. The glass to metal specimens were prepared by bonding a 1 × 2 × ¼ inch piece of glass onto two strips of 1 × 4 inch pieces of metal with a ½ inch overlap of glass to each metal strip. The thicknesses of the metal pieces were: Al — 64 mils., stainless steel — 50 mils. and the acrylic coated steel — 40 mils. The adhesive was cured by exposing the specimens to a mercury vapor medium pressure 400 watt lamp (360 m$\mu$, 254 m$\mu$) at a distance of 8 inches. The time for the adhesive to set was determined, as well as the tensile shear strength after 30 seconds and 1 minute exposure. The results are indicated in the following table.

| Glass to: | Aluminum Etched | Stainless Steel Solvent Wiped | Acrylic Coated Steel Solvent Wiped | Glass Solvent Wiped |
|---|---|---|---|---|
| Time to Set Between Substrate and ¼" Glass Slide | 2-3 Sec. | 2-3 Sec. | 2-3 Sec. | 2-3 Sec. |
| Tensile Shear Strength at 25° C after 30 Sec. U.V. Exposure | 290 psi. | 340 psi. | 650 psi. | 660 psi. |
| Tensile Shear Strength | | | | |

-continued

| Glass to: | Aluminum Etched | Stainless Steel Solvent Wiped | Acrylic Coated Steel Solvent Wiped | Glass Solvent Wiped |
|---|---|---|---|---|
| at 25° C after 1 Minute U.V. Exposure | 370 psi. | 290 psi. | 520 psi. | 640 psi. |

TESTED AFTER 24 HOURS AT 25° C

EXAMPLE 2

A similar composition was prepared, however, using 0.3 parts by weight of dimethoxyphenylacetophenone rather than 1.9 parts by weight. Specimens were prepared wherein the substrates bonded were glass to glass and glass to aluminum. The specimens were of the dimensions described previously and were cured in the same manner. The time to set and lap shear strength were determined and are reported in the following table:

| Ultraviolet Exposure | |
|---|---|
| Set time | 14 sec. |
| Glass to glass Lap Shear Strength at 25° C psi After 24 hours at 25° C | |
| 10 sec. | 845 |
| 30 sec. | 840 |
| 60 sec. | 810 |
| Glass to Aluminum Lap Shear Strength, psi After 24 hours at 25° C | |
| 10 sec. | 650 |
| 30 sec. | 730 |
| 60 sec. | 720 |

EXAMPLE 3

Using the composition of Example 1, two pieces of plexiglass were bonded together which contained the adhesive between a ½ inch overlap portion of the plexiglass. The final dimensions of the specimens were 7½ × 1 inch strips. The specimen was exposed to ultraviolet light as was done in Example 1. The lap shear strength was determined and reported in the following table:

| Ultraviolet Exposure | |
|---|---|
| Acrylic to Acrylic Lap Shear Strength at 25° C psi | |
| 1 minute | 70 |
| 5 minutes | 70–100 |

EXAMPLE 4

A light-curable composition was prepared by mixing 50 pbw (10 g) of the diacrylate of 1,3-bis (β'-hydroxyethyl)-5-ethyl-5-amylhydantoin, 50 pbw (10 g) of the diacrylate of 1,3-diglycidyl-5,5-dimethylhydantoin, 0.3 pbw (0.06 g) of dimethoxyphenylacetophenone and 0.5 pbw (0.1 g) of aminopropyltriethoxysilane. The adhesive was used to bond glass to glass and glass to aluminum. The sample preparation and curing was done in a manner similar to Example 1. The tensile lap shear strength was determined after 10, 20 and 30 seconds exposure. The results are indicated in the following table:

| Ultraviolet Exposure, sec. | Lap Shear at 25° C psi |
|---|---|
| Glass to Glass Lap Shear Strength at 25° C psi After 24 hours at 25° C | |
| 10 | 460 |
| 20 | 580 |
| 30 | 480 |
| Glass to Aluminum Lap Shear Strength at 25° C After 24 hours at 25° C | |
| 10 | 500 |
| 20 | 560 |
| 30 | 455 |

Glass to glass samples were tested for water resistance by immersing the samples in water after a 10 second cure. The results are indicated in the following table:

| Days in Water at 25° C | Lap Shear Strength at 25° C psi |
|---|---|
| 0 | 460 |
| 10 | 480 |
| 30 | 390 |
| 60 | 450 |

By substituting the diacrylate of 1,3-diglycidyl-5-amyl-5-ethylhydantoin for the diacrylate of 1,3-diglycidyl-5,5-dimethylhydantoin in the above composition, an adhesive was obtained which was used to bond glass to bonderized steel. The specimens were prepared and cured in a similar manner as in Example 1. The specimens were cured for 10, 20, and 30 seconds and the lap shear strength was determined. The results are indicated in the following table:

| Ultraviolet Exposure, sec. | Lap Shear Strength at 25° C psi After 24 hours at 25° C |
|---|---|
| 10 | 442 |
| 20 | 426 |
| 30 | 445 |

EXAMPLE 5

A light-curable composition was prepared by mixing 47.5 parts by weight of the diacrylate of 1,3-bis-(β'-hydroxyethyl)-5,5-dimethylhydantoin, 47.5 parts by weight of the diacrylate of 1,3-diglycidyl-5,5-dimethylhydantoin, 0.3 parts by weight a dimethoxy phenylacetophenone, 0.5 parts by weight of aminopropyltriethoxy silane and 5 parts by weight of 1,6-hexanediol diacrylate. The adhesive was used to bond glass to bonderized steel. The specimens were prepared and cured in a manner similar to Example 1. The tensile lap shear strength was determined after the specimens were cured for 10, 20 and 30 seconds. The results are indicated in the following table:

| Ultraviolet Exposure, sec. | Lap Shear Strength at 25° C psi After 24 hours at 25° C |
|---|---|
| 10 | 385 |
| 20 | 460 |
| 30 | 450 |

What is claimed is:
1. An ultraviolet light-curable adhesive composition comprising:
(a) from 25–75 parts of a diacrylate of the formula

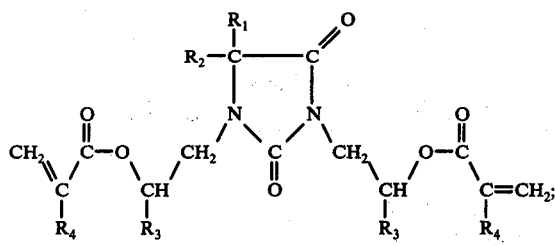

(b) from 25–75 parts of a diacrylate comprising
(1) from 80 to 100 parts of a compound of the formula

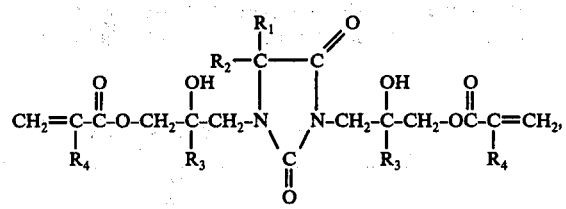

and (2) from 0 to 20 parts of a compound of the formula

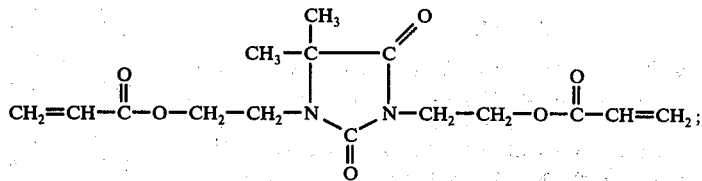

(c) from 0.01 to 2 parts of an organosilane adhesion promoter; and
(d) from 0.01 to 3 parts of a light sensitizer wherein each of $R_1$ and $R_2$ is hydrogen, alkyl of 1 to 8 carbon atoms, cycloalkyl of 5 or 6 carbon atoms, or phenyl or together $R_1$ and $R_2$ is tetramethylene or pentamethylene; and $R_3$ and $R_4$ are hydrogen or methyl.

2. The adhesive composition of claim 1 wherein
component (a) is present in the range of from 40 to 60 parts;
component (b) is present in the range of from 40 to 60 parts;
component (c) is present in the range of from 0.3 to 0.7 parts; and
component (d) is present in the range of from 0.2 to 1 parts.

3. The adhesive composition of claim 1 comprising:
a component (a) which is a diacrylate of the formula

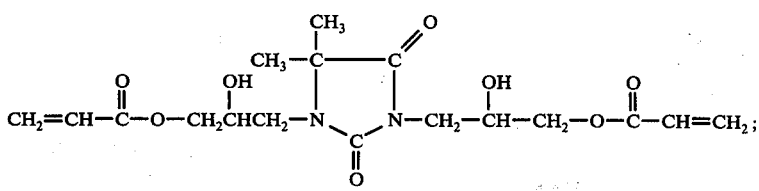

a component (b) (1) which is a diacrylate of the formula

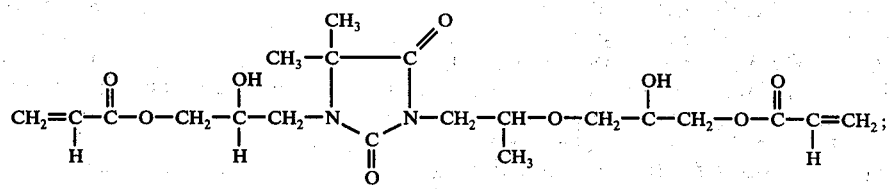

a component (b) (2) which is a diacrylate of the formula

CH$_2$=C-C-O-CH$_2$-C-CH$_2$-N    N-CH$_2$-CH-O-CH$_2$-C-CH$_2$-O-C-C=CH$_2$;

a component (c) which is aminopropyltriethoxy silane; and
a component (d) which is 2,2-dimethoxy-2-phenylacetophenone or 2,2-diethoxyacetophenone.

4. The adhesive composition of claim 3 comprising
(a) 50 parts of a diacrylate of the formula

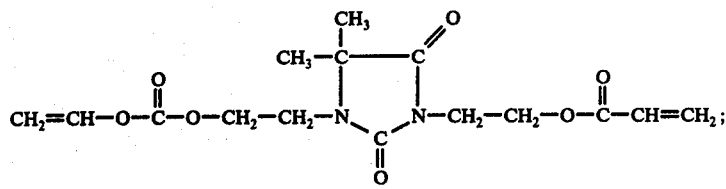
(b) 50 parts of a diacrylate of the formula
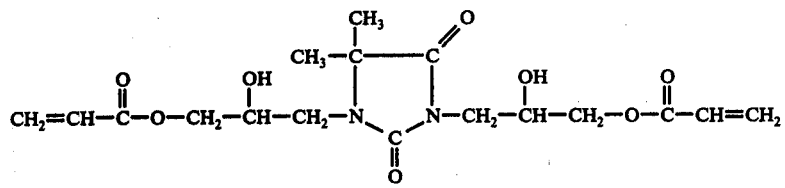
(c) 0.5 parts of aminopropyltriethoxy silane; and
(d) from 0.5 to 2 parts of dimethoxyphenylacetophenone.
* * * * *